US007890455B2

(12) United States Patent
Bourbonnais et al.

(10) Patent No.: US 7,890,455 B2
(45) Date of Patent: Feb. 15, 2011

(54) SYSTEM AND APPARATUS TO ENSURE A LOW-LATENCY READ OF LOG RECORDS FROM A DATABASE MANAGEMENT SYSTEM ("DBMS")

(75) Inventors: Serge Bourbonnais, Palo Alto, CA (US); Daniel B. Morales, Round Rock, TX (US); Clarence M. Pruet, Flower Mound, TX (US); Jonathan W. Wierenga, Wellington (NZ); Tyrone C. Yu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 12/128,488

(22) Filed: May 28, 2008

(65) Prior Publication Data

US 2009/0300073 A1    Dec. 3, 2009

(51) Int. Cl.
*G06F 7/00* (2006.01)
(52) U.S. Cl. .................................................. 707/609
(58) Field of Classification Search ................. 707/609, 707/696
See application file for complete search history.

(56) References Cited

U.S. PATENT DOCUMENTS

| | | | |
|---|---|---|---|
| 6,493,837 | B1 | 12/2002 | Pang et al. |
| 6,678,794 | B1 | 1/2004 | Talyansky et al. |
| 7,177,866 | B2 | 2/2007 | Holenstein et al. |
| 2002/0144059 | A1* | 10/2002 | Kendall ................. 711/118 |
| 2006/0218206 | A1 | 9/2006 | Bourbonnais et al. |
| 2007/0005666 | A1 | 1/2007 | Klein et al. |
| 2007/0174660 | A1 | 7/2007 | Peddada |

OTHER PUBLICATIONS

"Capture of Data in Q Replication", http://publib.boulder.ibm.com/infocenter/db2luw/v9r5/index.jsp?topic=/com.ibm.swg.im.iis.db.repl.intro.doc/topics/iiyrcintqrbcd.html, May 28, 2008.

* cited by examiner

*Primary Examiner*—Pierre M Vital
*Assistant Examiner*—Truong V Vo
(74) *Attorney, Agent, or Firm*—Kunzler Needham Massey & Thorpe

(57) ABSTRACT

A system and method to ensure a low-latency read of log records from a Database Management System ("DBMS") in asynchronous log-based database replication capture from a blocking log read Application Programming Interface ("API"). The system may include a replication server with a log read module to initialize a log read thread. The reading module of the log read thread may read a predefined number of DBMS log records. A log flush module of the log flush thread may be executed by the log read thread and waits for a read complete notification. The update module, in response to a log flush thread time out, may also generate a plurality of loggable transactions such that a number of log records in an internal API log satisfies a DBMS threshold and unblocks the DBMS API. Therefore, the latency time may be constant, low, and predictable ensuring an accurate replication capture.

4 Claims, 2 Drawing Sheets

SYSTEM AND APPARATUS TO ENSURE A LOW-LATENCY READ OF LOG RECORDS FROM A DATABASE MANAGEMENT SYSTEM ("DBMS")

BACKGROUND OF THE INVENTION

1. Field of the Invention

The invention relates to database replication. Particularly, the invention relates to ensuring a low-latency read of log records from a Database Management System ("DBMS") in asynchronous log-based database replication capture from a blocking log read Application Programming Interface ("API").

2. Description of the Related Art

Replication for a DBMS is a distributed technology that refers to the process of maintaining one or more copies of the same data, with or without transformations. The origin of the data is known as the "source," and the receiver of the copy is the "target." Asynchronous replication is the most common technique for database replication and is a process where at any given time, the source data is out of sync with the target data, but both are transactionally consistent.

A DBMS often provides an API to access the log records that it maintains for transactional recovery. A replication program may use these log records to capture the changes that occurred in the database and replicate them. Typically, log-based asynchronous database replication systems have 3 components: 1) a capture component to capture database changes at a source, by reading the DBMS recovery log; 2) a staging area where captured changes can be stored or sent to the target through various mechanisms; and 3) an "apply component" which receives these changes and commits them to the target.

The replication delay (or latency) is the time it takes for a change committed at the source database to be committed at the target database. Delays can be introduced at many steps during the replication process. However, a predictable and constant latency is expected for all transactions that are logically related. The latency corresponds to the age of the data at the target, which in turn affects business decisions. An application might not be able to make a business decision when some data is older than a certain age. The tolerable age or staleness of the data corresponds to the maximum replication latency.

In general, the latency is expected to be near real-time; however, latencies that are still acceptable for business decisions sometimes range from a fraction of a second, to a few seconds, a few minutes, or even hours. Transactions that are related by a common logical dependency must be replicated within a common maximum latency. For example, a transaction updating an ORDERS table will rely on the transactions updating the PARTS and PRICES catalogs to be replicated within the same tolerance, because the order needs the part number and prices to be up-to-date. An application might check replication latency at the target system to determine if the data is sufficiently up-to-date for proceeding with a business transaction involving the ORDERS, PARTS, and PRICES tables.

Because state-of-the art DBMS replication systems, such as IBM WebSphere Replication Server, replay (non-conflicting) transactions in parallel at the target DBMS to maximize throughput, replication latency will not be identical for all transactions. This is not a problem, as long as all logically related transactions are replicated within the same tolerance.

A database replication system must ensure that replication latency does not exceed the maximum tolerable latency, even during periods of unusual activity, low or high. Challenges regarding latency include the variable sizes of each transaction, inter-dependencies between these transactions, the performance of the DBMS, and the components of the replication system itself.

SUMMARY OF THE INVENTION

The present invention has been developed to provide a computer program product to ensure a low-latency read of log records from a DBMS in asynchronous log-based database replication capture from a blocking log read API. A plurality of modules configured to functionally perform the necessary steps of the computer program product include a log read module, a log flush module, an update module, a reading module, and a notification module. The log read module may initialize a log read thread in response to a log read begin, the log read thread configured to read a predefined number of DBMS log records in a single API call. The log flush module of the log flush thread, which may be executed by the log read thread, may wait for a read complete notification. Furthermore, the log flush thread may wait for a predefined time period, the predefined time period exceeding an expected log read call time.

The update module of the log flush thread may generate a loggable transaction, the loggable transaction updating a single row of a database table. The update module, in response to a log flush thread time out, may also generate a plurality of loggable transactions such that a number of log records in an internal API log satisfies a DBMS threshold. In certain embodiments, the update module may discontinue generating a plurality of loggable transactions in response to reaching a predetermined limit. In this instance, the log read thread then notifies the log flush thread upon a successful read and the log read thread ends its operation.

The reading module of the log read thread may read a predefined number of DBMS log records. The read may be in response to the internal API log having the number of log records which satisfy the DBMS threshold. Therefore, the log read thread may have an unblocked state.

The notification module of the log read thread may notify the log flush thread of a read complete such that the log flush thread completes. In one embodiment, the computer program product may further comprise a scan module. The scan module may scan a plurality of DBMS log records in response to a scan signal. Furthermore, the scan module may also detect an End of Log ("EOL") condition in response to the plurality of DBMS log records comprising entirely of log flush thread records.

A system of the present invention is also presented to ensure a low-latency read of log records from a DBMS in asynchronous log-based database replication capture from a blocking log read API. The system may be embodied as a network configured to communicate data between a plurality of devices, a DBMS server in communication with the network, a source database, a target server in communication with the network, a target database, and a replication server in communication with the network. In addition, the replication server may comprise a processor, a storage device comprising one or more data files, an input device, an output device, and a memory. Moreover, the memory may comprise similar modules as described above in relation to the computer program product.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
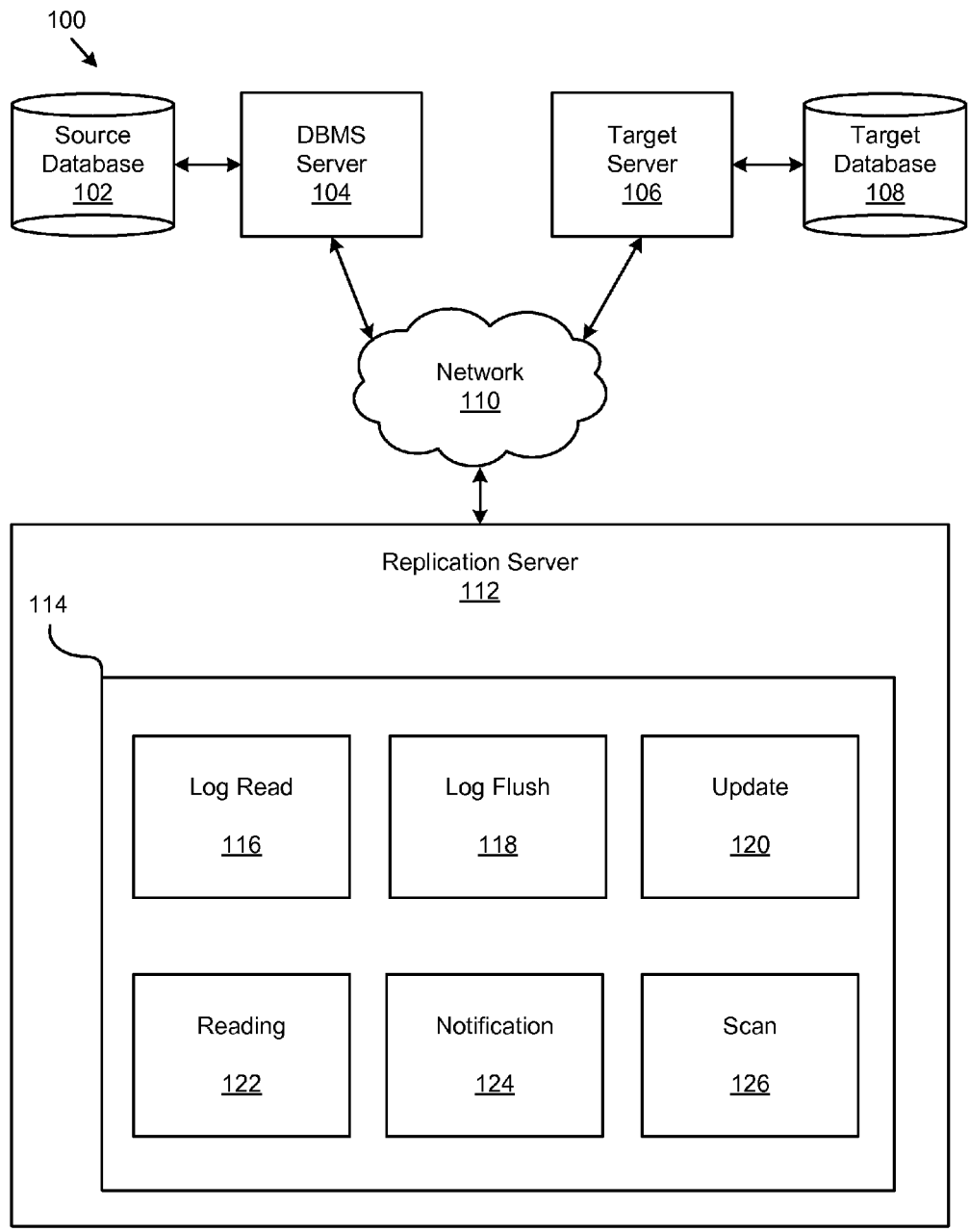
FIG. 1 is a schematic block diagram illustrating one embodiment of a system and accompanying modules for ensuring a low-latency read of log records from a DBMS in asynchronous log-based database replication capture from a blocking log read API.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates one embodiment of a system 100 to ensure a low-latency read of log records from a DBMS in asynchronous log-based database replication capture from a blocking log read API. The system 100 may include a source database 102, a DBMS server 104, a target server 106, a target database 108, a network 110, and a replication server 112. The DBMS server 104 may be configured to run a DBMS application and to communicate over a network 110 such as a Local Area Network ("LAN") or the internet. Furthermore, the DBMS application running on the DBMS server 104 may provide a log read API to access the log records that the DBMS maintains for transactional recovery. In addition to the DBMS server 104, the target server 106 may be in communication with the network 110 and configured to receive the replicated DBMS server data from the source database 102 for replication in the target database 108.

Database 102 changes reflected in the logs must be captured in guaranteed, predictable times and any overhead or bottlenecks within the components must be minimized to provide minimum latency and maximum throughput (the aggregate number of transaction that can be captured and replicated by a capture program in a given amount of time).

Respecting replication latency requirements requires the capture component to guarantee that all changes that have occurred by the time the log read API is called are returned in the same invocation. However, some log read APIs do not guarantee that log records already committed to disk will be returned when the API is called. Such a log read API might block until a certain number of DBMS log records exist. During periods of low or no database 102 activity, the log read API could block for an indefinite period of time, even if there were some DBMS log records already entered. Such scenarios can prevent the maximum tolerable latency requirement from being met.

Therefore, the replication server 112 may include an unblock module 114 which consists of a log read module 116, a log flush module 118, an update module 120, a reading module 122, and a notification module 124. In one embodiment, the log read module 116 initializes a log read thread. To improve log read performance, the log read thread may be configured to fetch multiple log records in one invocation or API call. In addition, the log read thread executes a log flush thread contained in the log flush module 118. The log read thread, through the reading module 122, makes a call to the DBMS API and reads a predefined number of DBMS log records. The log read thread is able to continue reading the DBMS log records as long as the DBMS API is nonblocked, or in other words, if the number of log records within the DBMS satisfies a certain DBMS threshold. In certain embodiments, this certain DBMS threshold is not alterable by the replication server 112. The following pseudo-code sample illustrates an example of a possible log read thread algorithm:

```
Notify (READBEGIN) //the log flush thread begins a LOG READ.
Read the log
Notify (READCOMPLETE) // the log flush thread has completed a LOG READ.
```

Example Code 1

The log flush thread of the log flush module 118, in turn, begins waiting on a waitpost synchronization primitive to which a specified, predefined timeout value is passed in. The timeout value represents the time the log read call is expected to take; this is an estimate based on previous invocations selecting the same number of log records. The log flush thread is configured to timeout if the wait time exceeds this value.

If the log flush thread times out on its initial wait and the call has not returned in the amount of time expected, one of two situations has occurred: 1) the number of log records in the DBMS is under the threshold and the log read API is blocked, or 2) an I/O or processor issue is causing a delay which is unrelated to the DBMS log record.

Upon a log flush thread time out, the update module 120 of the log flush thread may begin generating a loggable transaction, or a transaction that will create entries in the DBMS logs. One such example of a loggable, low resource transaction that may be used is updating a timestamp in a one row, one column table in the database 102. The update module 120 generates a plurality of small transactions until those updates have caused the log read API to return, meaning the log read is unblocked. Once the log read API is unblocked, the reading module 122 is able to continue reading the DBMS logs.

The notification module 124 of the log read thread then notifies the flush thread of a read complete once the log read is successful. In turn, the log flush thread ends, having completed its operation. In some embodiments, the log flush thread may not terminate after notification of a read complete due to resource costs in creating a new thread for the next log read. However, the function of the log flush thread is complete until reinitialization for the next log read. For the purposes of illustration, the following pseudo-code sample and associated definitions used in the code demonstrate a log flush thread algorithm:

```
Wait (forever) for notification (READBEGIN)
Wait (tTimeout seconds) for notification (READCOMPLETE)
nUpdates = 0;
while (no notification) and (nUpdates < nLimit)
{
    generate update to fill the log buffer
    nUpdates++;
    Wait (0 seconds) for notification (READCOMPLETE)
}
tCommitInterval - The commit interval specified for the capture
program. This means that database changes should be read from the log
and committed to the staging area before this limit. This represents the
maximum latency that is acceptable for the user.
tReadAvg - The average expected time to read records from the log
tTimeout - The period of time to wait before generating database activity
to flush log records through. The guideline for calculating tTimeout is as
follows:
tReadAvg < tTimeout < (tCommitInterval − tReadAvg)
nLimit - maximum number of records the flush will generate.
uUpdates - number of updates issued to flush the log
```

Example Code 2

In a further embodiment, the update module 120 generates loggable transaction updates until the loggable transaction updates have reached a predetermined limit on the number updates if the update module 120 has not received a read complete notification from the notification module 124. If the log flush thread generates enough records to ordinarily unblock the log read API, any continued blocking of the log read thread is the result of errors or delays in other internal processes such as an I/O or processor issue as described above. Therefore, generating more log records would only add to the internal delays by undue resource usage. Therefore, if the log flush thread reaches this predetermined limit, the log flush thread will wait for the log read thread to notify that the log read thread has completed its read without generating any more updates. Upon a read complete notification, the log read thread will return to a waiting state as described above (at READBEGIN).

In one embodiment, the computer program product further comprises a scan module 126 used to detect an EOL (End of Log) condition. True EOL detection is impossible in the presence of a blocking log read API because there is no way for the DBMS to differentiate between no activity, and not enough activity to fill the DBMS logs to the required threshold. Through analysis of the fetched log records, the scan module 126 may scan the DBMS log records and determine that an EOL has been reached when the only database changes reflected in the log records are entries generated by the log flush thread. Therefore, the EOL condition was true at the time the API was called. The scan module 126 may be executed in response to a scan signal triggered when the log read thread has read a certain number of DBMS log records, when the log flush thread has reached the predetermined limit on updates, when the log flush thread has generated a certain number of updates, or another similar point in the process.

While most applications use an API to merely read or access data, the replication server 112 may use the API to unblock the API and therefore positively influence the DBMS 104 for other users or applications concurrently accessing the DBMS 104 and also waiting for the API to unblock. Furthermore, the unblock module 114 imposes minimal overhead on the database. Specifically, the update module 120 generates just enough activity to unblock the log read API, and does so only if the replication server 112 is attempting to read from the log. In addition, the unblock module 114 provides predictable and consistent replication latencies, even during periods of low database activity, to ensure that the API never blocks for undetermined periods of time.

Figure 2:
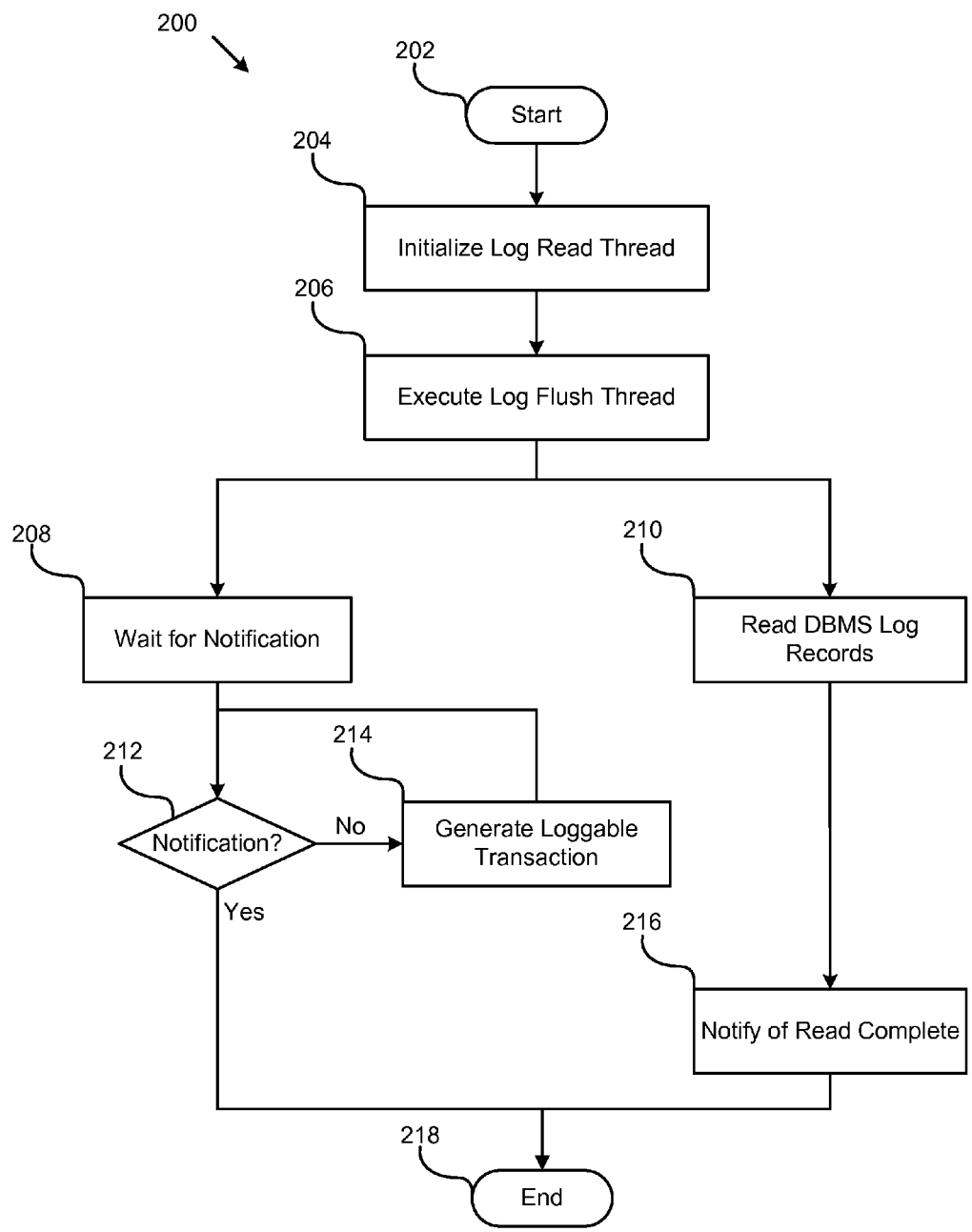
FIG. 2 is a high-level schematic block diagram illustrating one embodiment of a method for ensuring a low-latency read of log records from a DBMS in asynchronous log-based database replication capture from a blocking log read API.

Referring now to FIG. 2, one method 200 is represented for ensuring a low-latency read of log records from a DBMS in asynchronous log-based database replication capture from a blocking log read API. Specifically, the method 200 starts 202 when the log read module 116 initializes 204 a log read thread. The log read thread next executes 206 the log flush thread of the log read module 118 before beginning a log read, thus ensuring that both threads are functioning and synchronized. In turn, the log flush thread begins waiting 208 for a read complete notification. Simultaneously, the reading module 122 of the log read thread begins to read the DBMS log records 210. If the reading module 122 is blocked by the log read API and the log flush thread times out, the update module 120 of the log flush thread generates 214 a loggable transaction. The log flush thread then determines 212 whether a read complete notification has been received, and the update module 120 continues to generate loggable transactions as long as a read complete notification has not been received.

Once a sufficient number of updates have been generated 214 from the update module 120 to unblock the log read API, the reading 122 module of the log read thread continues reading 210 the DBMS log records. Upon completion of the log read, the notification module 124 of the log read thread notifies 216 the log flush thread of a log read complete. The log flush thread determines 212 that a read complete notification has been received. Then, the method 200 ends 218.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer readable medium for ensuring a low-latency read of log records from a Database Management System ("DBMS") in asynchronous log-based database replication capture from a blocking log read Application Programming Interface ("API"), the non-transitory computer readable medium comprising:

a log read module configured to initialize a log read thread in response to a log read begin, the log read thread configured to read a predefined number of DBMS log records in a single API call, the log read thread executing a log flush thread;

a log flush module of the log flush thread configured to be executed by the log read thread, the log flush thread configured to wait for a read complete notification, the log flush thread configured to wait for a predefined time period, the predefined time period exceeding an expected log read call time;

an update module of the log flush thread configured to generate a loggable transaction, the loggable transaction updating a single row of a database table, the update module generating a plurality of loggable transactions such that a number of log records in an internal API log satisfies a DBMS threshold in response to a log flush thread time out;
    wherein the update module discontinues generating a plurality of loggable transactions in response to reaching a predetermined limit, the log read thread notifying the log flush thread upon a successful read, the log flush thread completing;

a reading module of the log read thread configured to read a predefined number of DBMS log records in response to the internal API log having the number of log records satisfying the DBMS threshold, such that the log read thread has an unblocked state; and a notification module of the log read thread configured to notify the log flush thread of a read complete such that the log flush thread completes.

2. The non-transitory computer readable medium of claim 1, further comprising a scan module configured to scan a plurality of DBMS log records in response to a scan signal and detecting an End of Log ("EOL") condition in response to the plurality of DBMS log records comprising entirely of log flush thread records.

3. A system for ensuring a low-latency read of log records from a Database Management System ("DBMS") in asynchronous log-based database replication capture from a blocking log read Application Programming Interface ("API"), the system comprising:

a network configured to communicate data between a plurality of devices;
a DBMS server in communication with the network;
a source database;
a target server in communication with the network;
a target database;
a replication server in communication with the network, the replication server comprising:
a processor;
a storage device comprising one or more data files;
an input device;
an output device;
a memory comprising:
a log read module configured to initialize a log read thread in response to a log read begin, the log read thread configured to read a predefined number of DBMS log records in a single API call, the log read thread executing a log flush thread;

a log flush module of the log flush thread configured to be executed by the log read thread, the log flush thread configured to wait for a read complete notification, the log flush thread configured to wait for a predefined time period, the predefined time period exceeding an expected log read call time;

an update module of the log flush thread configured to generate a loggable transaction, the loggable transaction updating a single row of a database table, the update module generating a plurality of loggable transactions such that a number of log records in an internal API log satisfies a DBMS threshold in response to a log flush thread time out:
wherein the update module discontinues generating a plurality of loggable transactions in response to reaching a predetermined limit, the log read thread notifying the log flush thread upon a successful read, the log flush thread completing;

a reading module of the log read thread configured to read a predefined number of DBMS log records in response to the internal API log having the number of log records satisfying the DBMS threshold, such that the log read thread has an unblocked state;

a notification module of the log read thread configured to notify the log flush thread of a read complete such that the log flush thread completes; and a bus coupling the processor, storage device, input device, output device, and memory.

4. The system of claim 3, further comprising a scan module configured to scan a plurality of DBMS log records in response to a scan signal and detecting an End of Log ("EOL") condition in response to the plurality of DBMS log records comprising entirely of log flush thread records.

* * * * *